Figure 1:
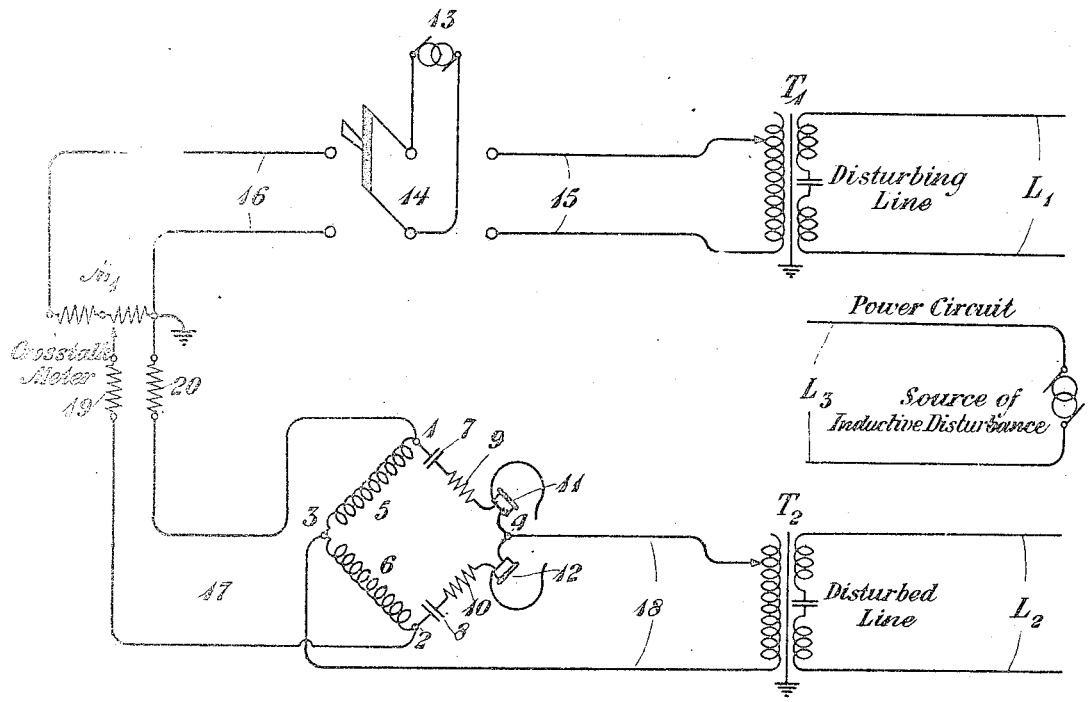

Dec. 11, 1923.

A. G. CHAPMAN 1,476,689

ELECTRICAL TESTING SYSTEM

Filed Dec. 6, 1921    2 Sheets-Sheet 2

INVENTOR
A. G. Chapman
BY
ATTORNEY

Patented Dec. 11, 1923.

1,476,689

UNITED STATES PATENT OFFICE.

ARTHUR G. CHAPMAN, OF EAST ORANGE, NEW JERSEY, ASSIGNOR TO AMERICAN TELEPHONE AND TELEGRAPH COMPANY, A CORPORATION OF NEW YORK.

ELECTRICAL TESTING SYSTEM.

Application filed December 6, 1921. Serial No. 520,398.

*To all whom it may concern:*

Be it known that I, ARTHUR G. CHAPMAN, residing at East Orange, in the county of Essex and State of New Jersey, have invented certain Improvements in Electrical Testing Systems, of which the following is a specification.

This invention relates to electrical testing systems and particularly to means for determining the magnitude of the crosstalk between two adjacent circuits.

The method commonly employed in making crosstalk tests consists in impressing upon one of the circuits (hereinafter referred to as the disturbing circuit) a varying electromotive force from a source such, for example, as a telephone transmitter and listening by means of a telephone receiver across the circuit which receives crosstalk (which may be termed the disturbed circuit) from the circuit upon which the varying electromotive force has been impressed. The electromotive force is then impressed upon a crosstalk meter which is connected with the said telephone receiver. The source is alternately connected to the disturbing circuit and to the crosstalk meter and the receiver is alternately connected to the disturbed circuit and to the crosstalk meter. The crosstalk meter is then adjusted until the same sound is heard when the receiver is connected with the disturbed line as when connected with the crosstalk meter. The dial of the meter is calibrated so as to indicate the ratio of the current in the receiver to that at the input terminals of the meter. This reading is sometimes expressed in crosstalk units.

Such a method is satisfactory where the disturbed line has therein no other current than that which results from the disturbing circuit. It is well known, however, that signaling circuits are often disturbed by other electrical circuits, such, for example, as power circuits which induce electromotive forces in the adjacent signaling circuits. It will be seen therefore, that when the source of testing electromotive force is connected with the disturbing circuit the current indicated by the receiver connected with the disturbed circuit results not only from the so-called disturbing circuit but also from the other electrical circuits which are sufficiently near the disturbed line as to produce current therein. When the source of testing electromotive force and the receiver are connected through the crosstalk meter the current in the receiver is that resulting from the testing electromotive force alone. It will be seen, therefore, that a defect in this method of measurement results from the presence of a current created by the foreign source of electromotive force, which is not compensated for when the source of testing electromotive force is connected through the crosstalk meter with the receiver.

It is the object of this invention to provide an arrangement whereby the error in the method heretofore employed may be eliminated.

Figure 2:
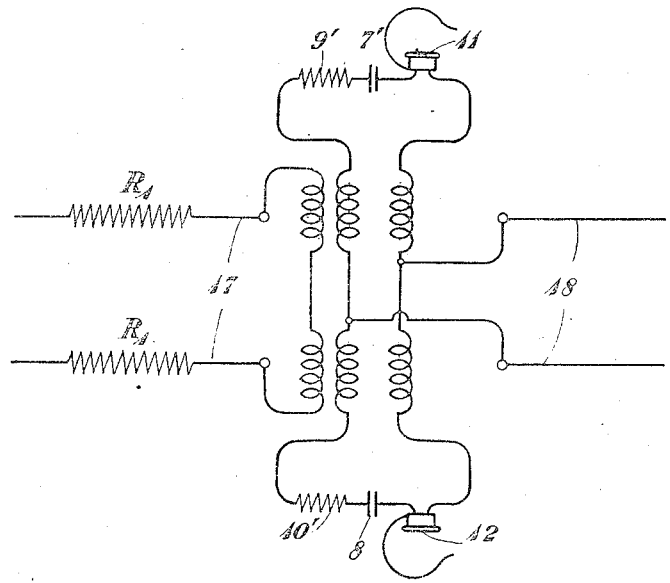
Figure 3:
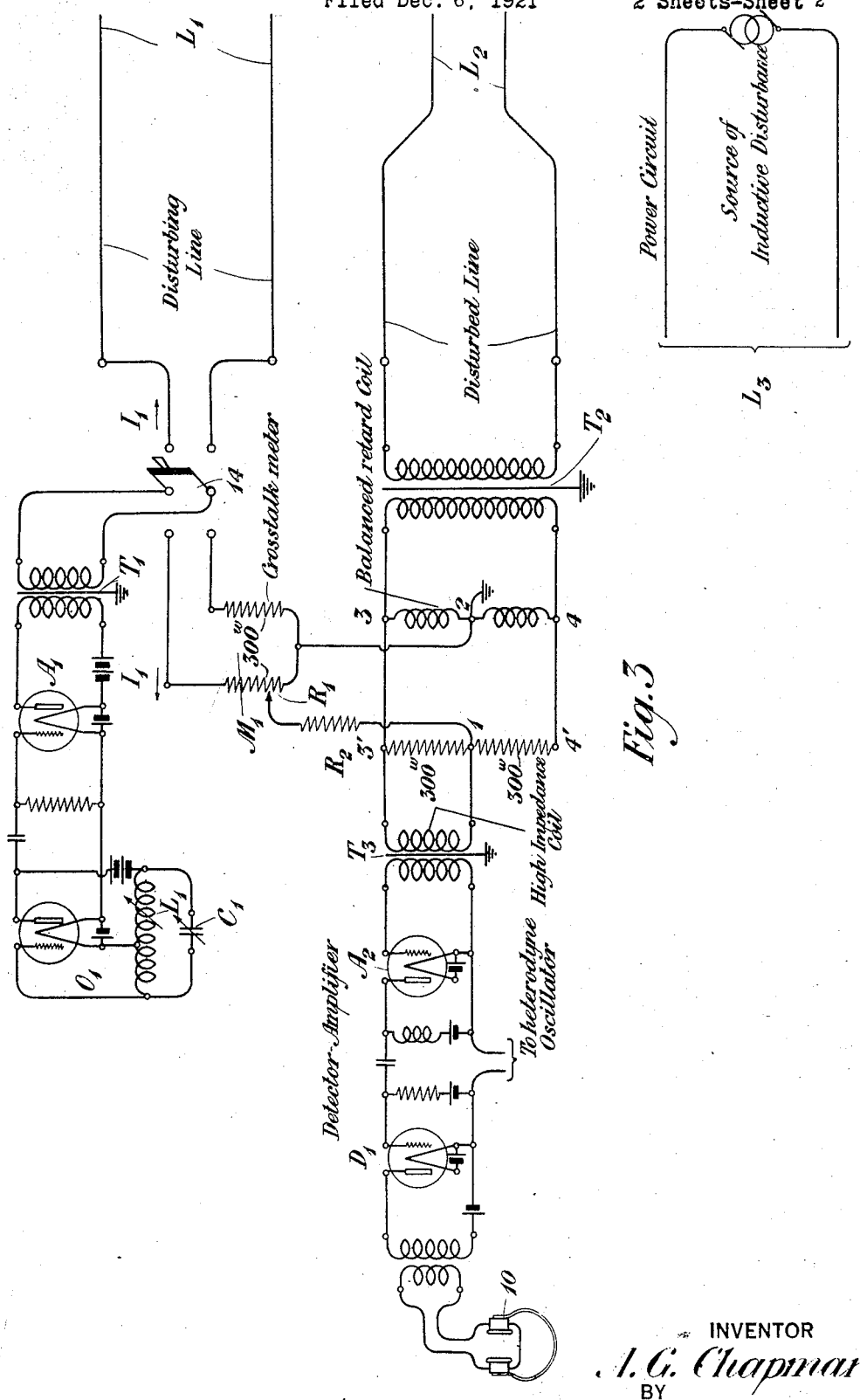

This invention will be better understood from the following description when read in connection with the attached drawings, of which Fig. 1 shows a circuit embodying the general principles of this invention, Fig. 2 shows an alternative form of network adapted to be substituted for the Wheatstone network shown in Fig. 1, and Fig. 3 shows a circuit adapted to measure the magnitude of crosstalk at carrier frequencies.

In Fig. 1, a source of varying electromotive force 13 is connected with the swinging contacts of the switch 14. The source 13 may be either a telephone transmitting set or a source of sinusoidal waves of a single frequency or of a plurality of frequencies. The switch 14 is adapted, when operated to the right, to connect the said source with the leads 15 which are connected with the input side of the transformer $T_1$. The output side of the said transformer is connected with the line circuit $L_1$ which for the purpose of description will be referred to as the disturbing line or circuit. When the switch 14 is operated toward the left, the source 13 is connected through the leads 16 with the crosstalk meter $M_1$. This meter is preferably a universal shunt having an impedance of about 600 ohms. It will be noted that the transformer $T_1$ is so designed so that the impedance ratio may be made variable in order that the impedance of any standard type of telephone circuit can be made approximately 600 ohms. Since this impedance equals that of the universal shunt, the current entering the transformer will be equal to that entering the shunt. The shunt is connected through the equal resistances 19 and 20 with the leads 17, which are connected with the corners 1 and 2 of the Wheatstone network. The other corners 3 and 4 of the said network are connected with the leads 18, which in turn are connected with one of the windings of the transformer $T_2$. The other winding of the said transformer is connected with the circuit $L_2$ which for the purpose of description will be referred to as the disturbed line or circuit. The transformer $T_2$ is also a variable impedance ratio transformer whose object is to raise the impedance of the apparatus connected thereto to the impedances of standard types of telephone circuits.

The Wheatstone network is designed to keep constant the current in the receiver resulting from induction in the line $L_2$ from a foreign source of electromotive force such as the power circuit $L_3$, regardless of whether the source 13 is connected with the disturbing line $L_1$ or with the crosstalk meter $M_1$. The Wheatstone network comprises a retardation coil made up of two carefully balanced windings 5 and 6 which form two of the arms of the bridge. These windings are arranged to be non-inductive to currents which enter the junction of the windings and divide equally between them. They offer, however, a high impedance to currents which flow through both windings in series. Each of the remaining two arms of the bridge is made up of a condenser 7 or 8, a resistance 9 or 10 and a receiver 11 or 12. The purpose of the condenser is to neutralize the reactance of the receiver. The purpose of the resistance is to build out the impedance of the arms so that variations in receiver impedance do not materially affect the impedance of the arms. The meter $M_1$ is, in effect, a universal shunt, being designed to indicate the ratio of the current flowing through the receiver to the current flowing through the shunt from the source of alternating current. It differs from the ordinary universal shunt in that it is calibrated to read in cross-talk units, and for this reason has been designated a cross-talk meter.

With the apparatus arranged as shown in the drawing, current from the crosstalk meter flows through the two receivers in series, the retardation coil acting as a very high impedance bridge across the arms containing the receivers and consuming practically no energy. The disturbed line is connected to the bridge so that current from it flows through the receivers in multiple, the retardation coils being non-inductive under these circumstances. When the arms containing the receivers are approximately alike in impedance the disturbed line causes practically no loss to the crosstalk meter branch 17 and the crosstalk meter similarly has slight effect on the current from the disturbed line $L_2$. With this arrangement, noise currents from the disturbed line, resulting from induction from the foreign source $L_3$, flow through the receiver for either position of the switch 14 since the line $L_2$ is always connected with the Wheatstone network through the leads 18.

Having in mind the foregoing description of the parts of the apparatus, the invention will be clearly understood from the following description of the mode of operation of the circuit.

With the receivers connected to the ears of the testman the switch 14 is thrown to the right, thereby connecting the source 13 to the disturbing line $L_1$. The testman, after noting the magnitude of the tone produced by the current induced in the line $L_2$ by the line $L_1$, and also by the source of foreign electromotive force $L_3$, then throws the switch 14 to the left, thereby connecting the source 13 through the meter $M_1$ to the Wheatstone network. He then notes the magnitude of the tone produced by the source 13 and also that resulting in the line $L_2$ from the foreign source $L_3$. He then makes an adjustment of the meter $M_1$ and again throws the switch 14 to the right-hand position, thereby connecting the source 13 again to the line $L_1$. By alternately throwing the said switch to its opposite positions and making the proper adjustment of the meter $M_1$, a position of the said meter will be arrived at where the current in the receivers, when the switch is connected with the line $L_1$, will be the same as when the switch is connected with the crosstalk meter. The reading of the crosstalk meter at this point indicates the magnitude of the crosstalk resulting from induction in the line $L_2$ from the testing electromotive force impressed across the line $L_1$.

A form of network adapted to be substituted for the Wheatstone network is shown in Fig. 2. It comprises a triple-winding transformer known as a hybrid coil, one of the windings of which is connected through the leads 17 with the crosstalk meter. Bridged across the midpoints of the other windings are the leads 18 and connected in series with the said windings are the resistances 9' and 10', the condensers 7' and 8' and the receivers 11 and 12. Due to the principle of the hybrid coil, if the two receivers have exactly the same impedance over the range of frequencies involved, the connection of the disturbed line to the hybrid coil will not change the amount of testing current flowing in the receivers when the source of testing electromotive force is connected with the meter, and vice versa, the connection of the meter to the hybrid coil will not affect the amount of testing current flowing into the receivers from the disturbed line when the source of testing electromotive force is connected with the disturbing line. The current induced in the disturbed circuit from any foreign source will, of course, flow through the receivers regardless of whether the source of testing electromotive force is connected with the disturbing line or with the meter, and therefore, it is possible to determine accurately the ratio between the testing current sent into the meter and the testing current in the disturbed line due to the disturbing line.

Fig. 3 shows an adaption of this invention in measuring the magnitude of carrier current crosstalk. The measurements are preferably made over a range of frequencies using an adjustable single frequency source. This source is represented by the feed-back oscillator $O_1$, the frequency of which may be varied by adjusting the constants of the inductance $L_1$ and the condenser $C_1$ connected with the oscillation circuit. The oscillations are amplified by the amplifier $A_1$ and impressed by means of the transformer $T_1$ across the swinging contacts of the switch 14. This switch when operated toward the right connects the said source with the disturbing line $L_1$, and when operated toward the left connects the source with the meter $M_1$. The disturbed line $L_2$ is connected through the transformer $T_2$ with the points 3 and 4 of the balanced retardation coil and also with the points 3' and 4' of the resistance. The meter $M_1$ is connected across the midpoints 1 and 2 of the said resistance and the retardation coil respectively. A part of the said resistance included between the terminals 1 and 3' is connected with one of the windings of the transformer $T_3$, the other winding of which is connected through the amplifier $A_2$ and the detector $D_1$, which operates on the heterodyne principle of detection. A receiver 10, or a pair of receivers, is connected across the output side of the said detector. Although the source of foreign disturbances is represented by the circuit L, it is a fact that disturbances of carrier frequencies are more often caused by static and by radio, so that the circuit $L_3$ simply represents any source of disturbances foreign to the circuits under investigation.

The method of making a crosstalk measurement at carrier frequencies will be clear in view of the foregoing description of the parts of this circuit. Oscillations of a definite frequency created by the oscillator $O_1$ and amplified by the amplifier $A_1$ are impressed upon the disturbing line $L_1$ when the switch 14 is operated toward the right. These oscillations will produce others in the disturbed line $L_2$ simultaneously with the induction therein of an electromotive force from the foreign source $L_3$. The resultant electromotive force will be impressed across the terminals 3 and 4, and 3' and 4', of the balanced network. Due to the balanced condition of this network no current from the line $L_2$ will flow through the circuit containing the crosstalk meter. Due to current in branch 3' 4' the drop in potential across the resistance between the terminals 1 and 3' will be impressed by the transformer $T_3$ upon the amplifier $A_2$ and when amplified will be in turn impressed across the detector $D_1$. Oscillations from a heterodyne oscillator which may be similar in structure and operation to $O_1$ will also be impressed across the detector $D_1$. The current resulting from the beating together of these oscillations will be detected by the receivers 10 and the magnitude of this current will be indicated by the volume of the tone in the receivers. The switch 14 is then thrown to the left, which serves to connect the oscillator $O_1$ through the crosstalk meter $M_1$ with the detector circuit. In view of the balance existing in the network, no current will be produced in the disturbed line $L_2$ from this source since the points 3, 3' and 4, 4' will be at the same potential. However, current induced in the line $L_2$ from a foreign source $L_3$ will be impressed across the network simultaneously with the impression thereon of oscillations from the source $O_1$ through the meter $M_1$. The resultant current will be impressed by the transformer $T_3$ upon the amplifier $A_2$ and when amplified will in turn be impressed upon the detector $D_1$ simultaneously with the impression thereon of oscillations from the heterodyne oscillator. The resultant detected current will be manifested by a tone in the receivers 10. By alternately throwing the switch 14 in opposite directions and varying the magnitude of the constants of the meter $M_1$ a point of adjustment will be reached where the current through the meter $M_1$ will be equal to that induced in the disturbed line $L_2$ by the disturbing line $L_1$ when the latter line is connected with the source of oscillations $O_1$. The reading of the crosstalk meter will be the measure of the magnitude of the crosstalk induced in the disturbed line $L_2$ by the disturbing line $L_1$, free from any error resulting from the induction in the said disturbed line of currents from a foreign source such as $L_3$.

Although reference has been made in the foregoing description to telephone circuits, the invention is not so limited, but may be used in measuring and determining the magnitude of disturbances set up in any type of circuit by other adjacent circuits.

Although this invention has been disclosed as embodied in a particular arrangement of parts, it is not limited but is capable of embodiment in other forms without departing from the spirit and scope of the appended claims.

What is claimed is:

1. In an electrical testing system comprising two circuits electrically exposed to each other and also to foreign sources of potential, a universal shunt designed to show units of cross-talk, a source of testing electromotive force adapted to be connected with one of said circuits and also with the said universal shunt, a network having current indicating means connected with the said universal shunt and with the other of said circuits, the method of measuring the magnitude of current induced in the said second circuit which consists in impressing alternately an electromotive force upon the said first circuit and upon the said universal shunt, allowing current induced in the said second circuit by the said first circuit and also by the foreign source of electromotive force to be impressed upon the said network and measured thereby, allowing current through the said universal shunt to be impressed on the said network simultaneously with the current induced in the said second circuit by the foreign sources, varying the constants of the said universal shunt until the current indicated by the indicating means associated with the said network when the said source of testing circuit is connected with the said first circuit, equals that when the source is connected with the said meter.

2. In an electrical testing system comprising two circuits electrically exposed to each other constituting a disturbing and a disturbed circuit and also exposed to foreign sources of potential, a universal shunt designed to show units of crosstalk, a source of testing electromotive force adapted to be connected with one of said circuits and also with the said universal shunt, a network having current indicating means connected with the said universal shunt and with the other of said circuits, the method of determining the magnitude of crosstalk between the disturbing and the disturbed signaling circuit, the latter being also inductively exposed to foreign circuits, which consists in alternately impressing testing electromotive force upon the said disturbing circuit and upon the said universal shunt, allowing the current induced in the said disturbed circuit by the said first circuit and by the said foreign source to be impressed on the said network, allowing current through the said universal shunt and current induced in the said second circuit by the said foreign source to be simultaneously impressed on the said network and varying the constants of the said universal shunt until the currents are substantially equal.

3. The method of measuring crosstalk between two signaling circuits, at least one of which is also exposed to a foreign source of electromotive force, which consists in alternately impressing a testing electromotive force upon one of the said signaling circuits and upon a universal shunt adapted to indicate cross-talk units, impressing upon a network the current induced in the other signaling circuit by the said first circuit and by the said other source, impressing upon the network the current transmitted through the said universal shunt and also current induced in the said second circuit by the foreign source, and varying the constants of the said universal shunt until the currents impressed upon the said network from their respective sources are equal.

4. In an electrical testing system, the combination of two signaling circuits, one of which is subjected to disturbance from the other and also from foreign sources of electromotive force, a source of testing electromotive force, a universal shunt designed to indicate cross-talk units, a Wheatstone network containing current indicating means having two opposite corners connected with the said universal shunt and the other two corners connected with the exposed circuit, and switching means to connect the said source of testing electromotive force with the disturbing circuit and with the universal shunt.

5. In an electrical testing system, the combination of two signaling circuits, a third circuit adapted to induce an electromotive force in one of the said signaling circuits, a source of testing electromotive force, a universal shunt, a Wheatstone network connected with the said universal shunt and also with the said signaling circuit in which an electromotive force is induced, and switching means to connect the said source either with the other of said signaling circuits or with the said universal shunt.

6. In an electrical testing system, the combination of a disturbing circuit, a disturbed circuit, a source of foreign electromotive force capable of inducing current in the said disturbed circuit, a source of testing electromotive force, a universal shunt, a Wheatstone network having a current indicating means associated therewith connected with the said universal shunt and the said disturbed circuit, and switching means to connect the said source of testing electromotive force with either the said disturbing circuit or with the said universal shunt.

In testimony whereof, I have signed my name to this specification this 3rd day of December, 1921.

ARTHUR G. CHAPMAN.